US005806162A

United States Patent [19]

Pizzino

[11] Patent Number: 5,806,162

[45] Date of Patent: Sep. 15, 1998

[54] GUDGEON PIN REMOVAL TOOL

[76] Inventor: Antonino Pizzino, 3 Moorelands Road, Hectorville, South Australia, Australia

[21] Appl. No.: 720,750

[22] Filed: Oct. 1, 1996

[51] Int. Cl.[6] .......... B23Q 1/00

[52] U.S. Cl. .......... 29/281.5; 29/251; 29/283

[58] Field of Search .......... 29/251, 283, 255, 29/257, 276, 280, 282, 256, 258, 263, 281.5

[56] References Cited

U.S. PATENT DOCUMENTS

| | | | |
|---|---|---|---|
| 773,912 | 11/1904 | Bartlett | 29/251 |
| 1,394,963 | 10/1921 | Beach | 29/283 |
| 1,512,422 | 10/1924 | Hatcher et al. | 29/251 |
| 1,544,393 | 6/1925 | Hatcher et al. | 29/251 |
| 4,118,852 | 10/1978 | Schneider | 29/283 |
| 4,852,231 | 8/1989 | Turner | 29/283 |

*Primary Examiner*—Robert C. Watson

*Attorney, Agent, or Firm*—Watts, Hoffmann, Fisher & Heinke Co., L.P.A.

[57] ABSTRACT

A tool (10) for removal of a gudgeon pin (33) from an assembly (34) of a reciprocating end of a connecting rod (28) and a piston wherein there is provided a base (11), a post (16), a pair of projecting half-arms (12, 13) projecting forwardly of the post (16) and above the base (11), each of the half-arms (12, 13) each having a support web (27) with a semi-circular inner edge which co-operates with the inner edge of the other half-arm (13, 12) to provide an ejection aperture (32) for the gudgeon pin (33) while the webs (27) of the half-arms (13, 12) resist the ejection pressure and thereby avoid piston damage.

6 Claims, 4 Drawing Sheets

GUDGEON PIN REMOVAL TOOL

This invention relates to a tool for the removal of replacement of a gudgeon pin between the reciprocating end of a connecting rod and a piston of an internal combustion engine.

Some gudgeon pins are pressed into an aperture in the reciprocating end of a connecting rod, and the bearing surfaces are between the gudgeon pin and the piston, but it is essential that the press fit should hold during the whole of the life of the engine, and therefore the amount of interference is near the uppermost limit of standard fits. Consequently the removal of the gudgeon pin, for example for service of a piston or other work which may be required on an engine, is a difficult task, particularly since most pistons are made from light metal such as aluminium alloys, which can readily deform, and this is exacerbated by a tapered shape of the inner surface of many pistons. Deformation of a piston is unacceptable if the piston is to be re-used, and therefore the piston cannot itself be used as the reaction member for pressing out the gudgeon pin. Furthermore, there is a danger of bending the upper end of a connecting rod, due to the aforesaid tapered surface.

It is known that fork-like spacers have been proposed heretofore, but there are instances wherein they are not sufficiently rigid, and do not engage a sufficient area surrounding the gudgeon pin to ensure that no deformation will occur. It is therefore the object of this invention to provide an improvement, wherein the gudgeon pin surround is more nearly complete than with previously proposed arrangements, and in an embodiment of the invention there is provided a base, a pair of projecting half arms, an engagement means between the half arms and the base to retain the half arms in position, each of the half arms having a web with a semi-circular aperture which matches the semi-circular aperture of the other half arm to provide an ejection aperture for the gudgeon pin.

Figure 1:
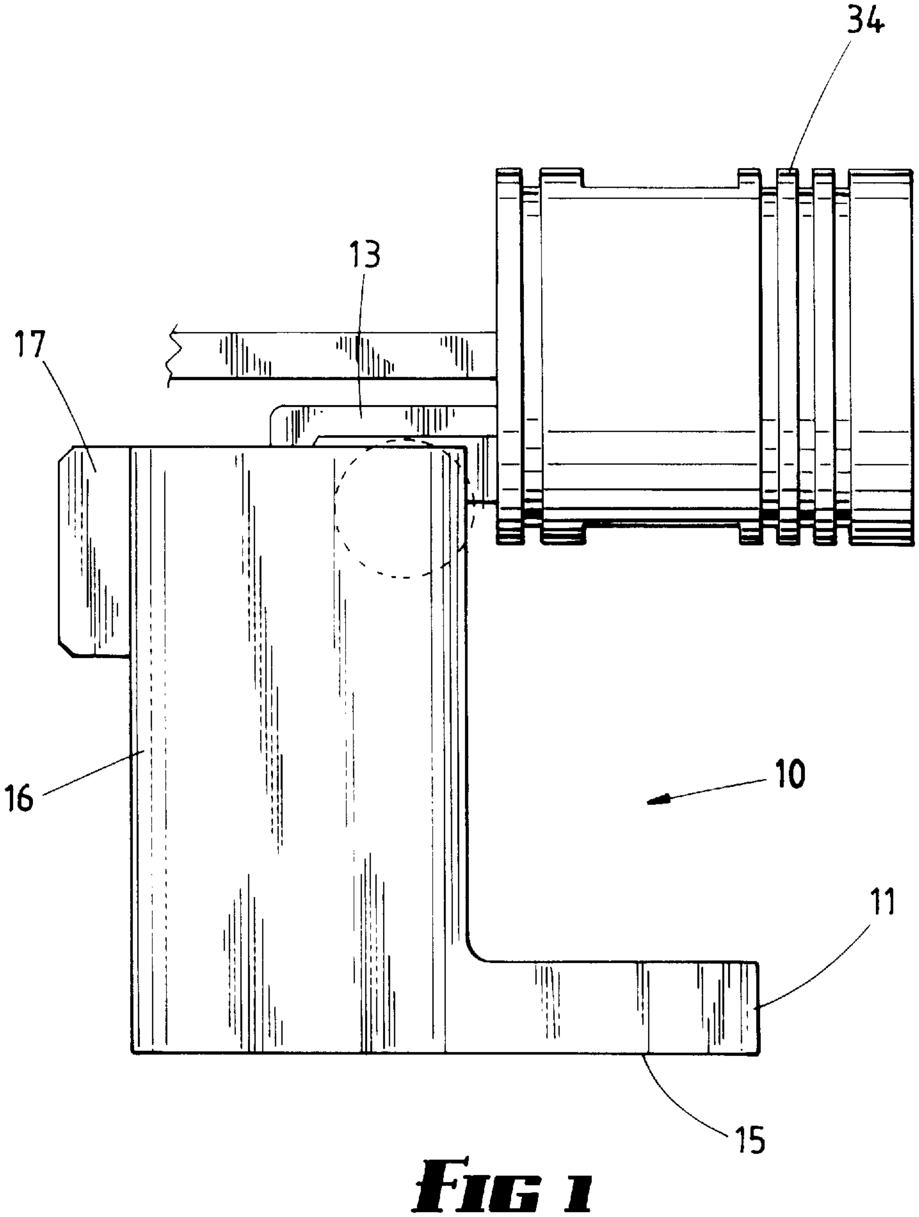
Figure 2:
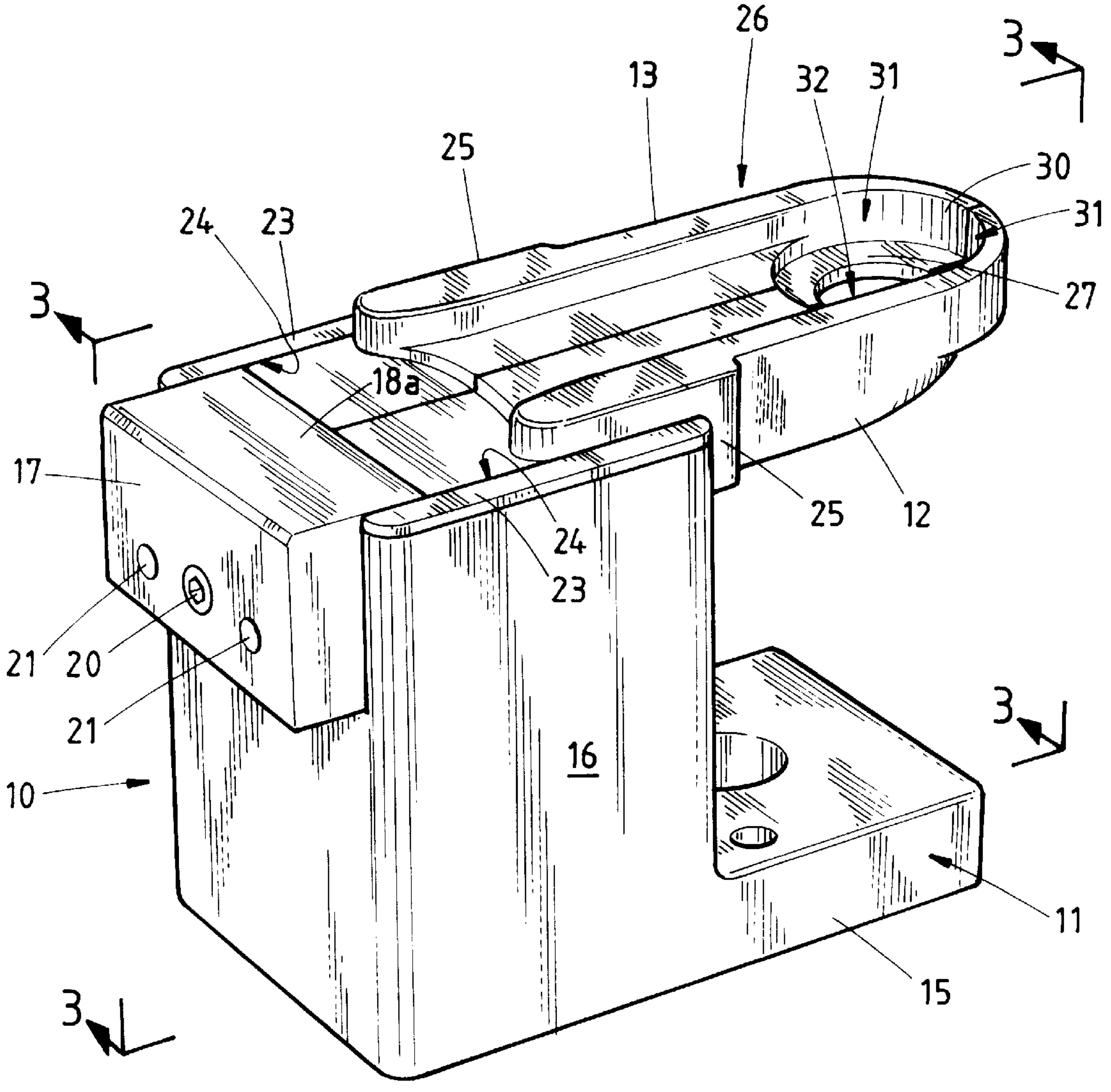
Figure 3:
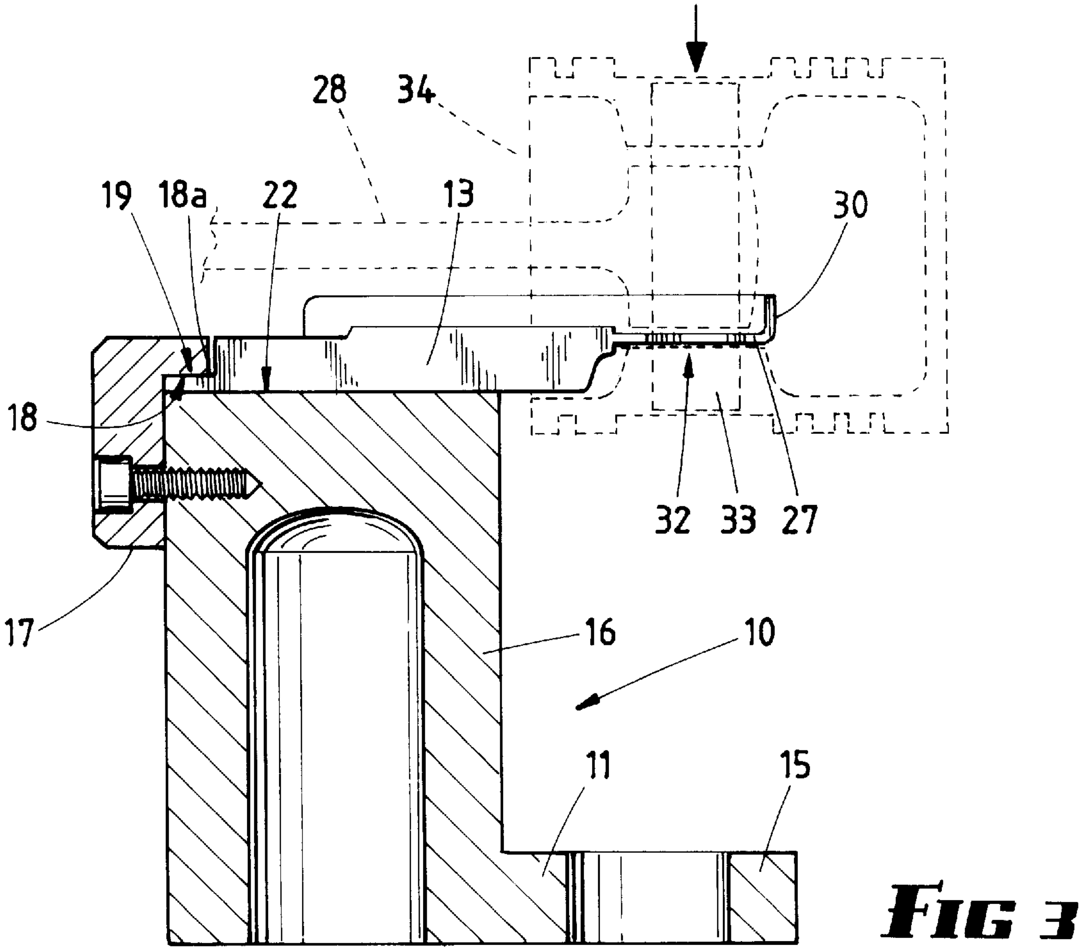
Figure 4:
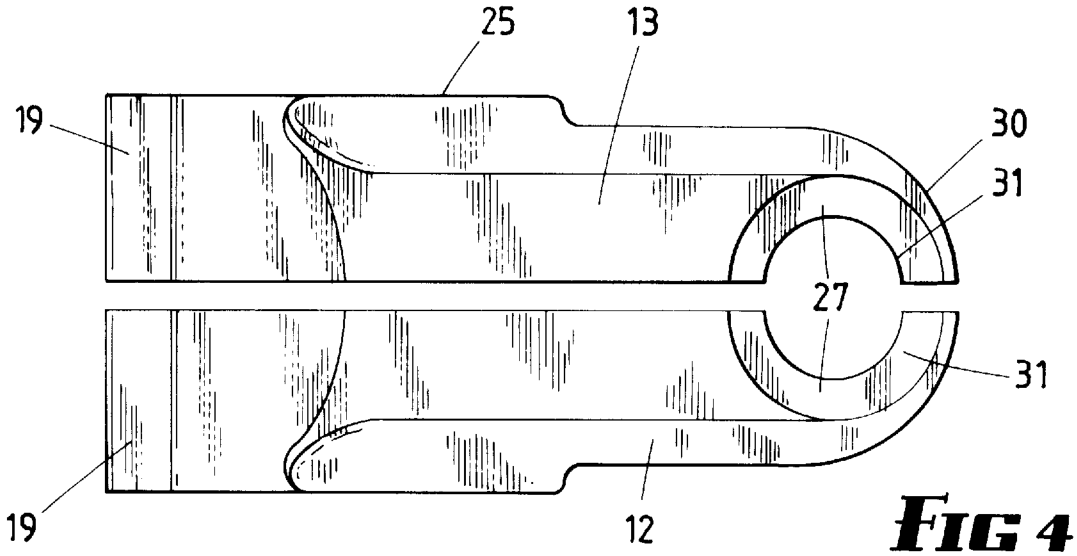
Figure 5:
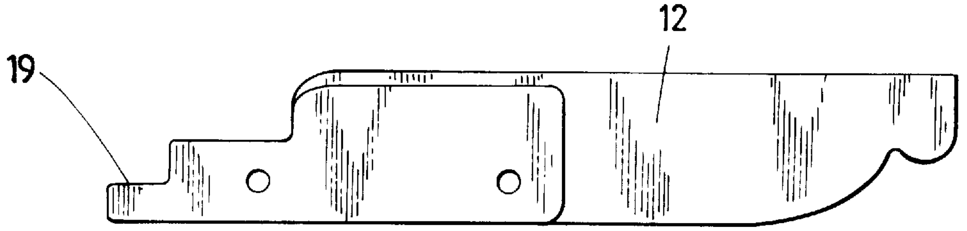
Figure 6:
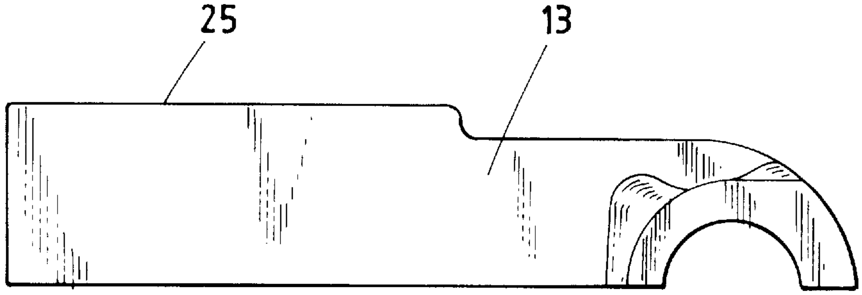

An embodiment of the invention is described hereunder in some further detail with reference to and is illustrated in the accompanying drawings in which FIG. 1 is a side view of the removal tool in its assembled condition, FIG. 2 is a perspective view of the removal tool in its assembled condition, FIG. 3 is a side view, showing the manner in which a pin can be ejected, FIG. 4 is a top view of the half arms, FIG. 5 is a side view of FIG. 4, and FIG. 6 is an underside view of a half arm of FIG. 4.

Referring to the drawings, a removal tool 10 comprises three components, there being a base 11, a left hand half arm 12 and a right hand half arm 13.

The base 11 is provided with a horizontal flat plate 15 and an upstanding post 16. The upstanding post 16 is itself provided with a reaction member 17 with an undercut surface 18, the undercut surface 18 being a reaction surface which is engaged by a shelf 19 at the tail end of each of the half arms 12 and 13. There is also a threaded aperture 20 in one side of the post 16, to receive a threaded clamping screw (not shown).

The post 16 has a flat land 22 at its upper end, and is flanked by two upwardly projecting portions 23. The projecting portions 23 present locating faces 24 which locate against the side surfaces 25 of the half arms 12 and 13, and the clamping screw clamps the half arms together so that when clamped together they present an arm assembly 26 (FIG. 1), and the arm assembly 26 provides a support web 27 which supports the reciprocating end of a connecting rod 28 (see also FIG. 2) and as best seen in FIG. 4, the web 27 is stiffened by an upstanding flange 30.

The web 27 in each of the half arms 12 and 13 is provided with a semi-circular recess 31, and the semi-circular recesses 31 combine upon assembly of the half arms face to face to provide an ejection aperture for a gudgeon pin 32 of a piston 33.

In use, the two half arms are readily entered into the spaces on respective sides of the connecting rod 28, and can be positioned beneath the reciprocating end thereof, to lie face to face and give support for the entire area of the connecting rod which surrounds the gudgeon pin 32.

In the same way as the tool is used for removal of the gudgeon pin, it can be used for assembly.

A consideration of the above embodiment will therefore indicate that the invention, although providing a more complex tool than heretofore, provides a tool which nevertheless avoids possibility of danger to the piston shape, and provides the maximum support for the reciprocating end of the connecting rod which can be achieved with a tool of this type.

I claim:

1. A gudgeon pin removal tool for removal of a gudgeon pin from an assembly of a reciprocating end of a connecting rod and a piston, comprising a base, a post upstanding from said base, a surface at a read end of said post defining arm retaining means, a pair of discrete, complementary half-arms lying side by side, each said half-arm having a rear end releasably engagable by said retaining means, said post having an upper face which supports said half-arms for part but not all of their lengths such that said half-arms project forwardly of said post a sufficient distance to be insertable within such piston, part-circular surfaces on said projecting ends of the half-arms which between them define a recess of shape and dimension to support such a reciprocating end of such a connecting rod while at least partly surrounding a connected gudgeon pin.

2. A tool according to claim 1 wherein said retaining means surface is a downwardly facing surface which overlies upper surfaces of said half-arm rear ends and inhibits tilting of said half-arms upon application of pressure to said forwardly projecting portions thereof, in a direction towards said base.

3. A tool according to claim 2 further comprising a plate at the rear end of said post having a forwardly projecting flange, said retaining means surface being an under surface of said flange.

4. A tool according to claim 1 wherein said part-circular surfaces include surfaces of support webs on respective said half-arms which define between them a gudgeon ejection aperture.

5. A tool according to claim 4 further comprising flanges upstanding from peripheries of said support webs.

6. A tool according to clam 1 wherein the upper surface of said post includes a flat land which is flanked by upstanding side flanges, facing surfaces of said side flanges locating against outer side surfaces of said half-arms.

* * * * *